(12) United States Patent
Abraham et al.

(10) Patent No.: US 8,936,882 B2
(45) Date of Patent: Jan. 20, 2015

(54) ELECTROLYTE COMPOSITIONS FOR LITHIUM AND LITHIUM-ION BATTERIES

(75) Inventors: Daniel P. Abraham, Bolingbrook, IL (US); Gang Cheng, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 663 days.

(21) Appl. No.: 13/219,825

(22) Filed: Aug. 29, 2011

(65) Prior Publication Data
US 2013/0052542 A1 Feb. 28, 2013

(51) Int. Cl.
*H01M 6/16* (2006.01)
*H01M 10/0525* (2010.01)
*H01M 10/0568* (2010.01)
*H01M 10/0569* (2010.01)

(52) U.S. Cl.
CPC ...... *H01M 10/0525* (2013.01); *H01M 10/0568* (2013.01); *H01M 10/0569* (2013.01); *H01M 2300/0037* (2013.01); *H01M 2300/0028* (2013.01); *Y02E 60/122* (2013.01); *Y02T 10/7011* (2013.01)
USPC ........... 429/332; 429/307; 429/323; 252/62.2

(58) Field of Classification Search
CPC .................... H01M 10/0567; H01M 10/0568; H01M 10/0569; H01M 10/052; H01M 2300/0037; H01M 2300/0028; H01M 2300/0051; Y02E 60/122
USPC ......... 429/307, 330, 331, 332, 338, 342, 323, 429/322; 252/62.2
See application file for complete search history.

(56) References Cited

U.S. PATENT DOCUMENTS

| | | | |
|---|---|---|---|
| 5,086,374 A | 2/1992 | MacFarlane et al. |
| 6,315,918 B1 | 11/2001 | Mita et al. |
| 6,692,874 B2 | 2/2004 | Kim et al. |
| 6,853,472 B2 | 2/2005 | Warner et al. |
| 7,026,073 B2 | 4/2006 | Ueda et al. |
| 7,776,465 B1 | 8/2010 | Hatazawa et al. |
| 2002/0168575 A1* | 11/2002 | Smith et al. ............ 429/317 |
| 2003/0157413 A1* | 8/2003 | Chen et al. ............. 429/329 |
| 2005/0170253 A1* | 8/2005 | Yoon et al. ............. 429/307 |
| 2007/0059607 A1 | 3/2007 | Nakanishi et al. |

FOREIGN PATENT DOCUMENTS

WO 2008143293 A1 11/2008

OTHER PUBLICATIONS

Y. Chernyak, Dielectric Constant, Dipole Moment, and Solubility Parameters of Some Cyclic Acid Esters, J. Chem. Eng. Data, vol. 51, 416-418 (2006).
Y. Chernyak et al., Vapor Pressure and Liquid Heat Capacity of Alkylene Carbonates, J. Chem. Eng. Data, vol. 49, 1180-1184 (2004).
J. H. Clements, Reactive Applications of Cyclic Alkylene Carbonates, Ind. Eng. Chem. Res., vol. 42, 663-674 (2003).

* cited by examiner

*Primary Examiner* — Laura Weiner
(74) *Attorney, Agent, or Firm* — Olson & Cepuritis, Ltd.

(57) ABSTRACT

The present invention provides an electrolyte composition for a lithium or lithium-ion battery comprising a lithium salt in a liquid carrier comprising (a) a linear alkyl carbonate solvent, a cyclic alkyl carbonate solvent, or a combination thereof, and (b) a glycerol carbonate derivative compound of Formula (I):

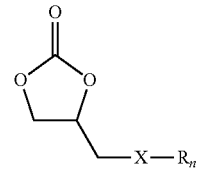

(I)

wherein X is selected from O, O(CO)O, S, N, P, P(=O), B, and Si; n is 1 when X is O, O(CO)O, or S; n is 2 when x is N, P, P(=O), or B; n is 3 when X is Si; and each R independently is selected from alkyl, alkenyl, alkynyl, aryl, acyl, heteroaryl, a 5-member ring heterocyclic group, a 5-member ring heterocycle-substituted methyl group, trialkylsilyl, and any of the foregoing substituted with one or more fluoro substituents, provided that R is acyl only when X is O, S, or N, and R is not alkyl when X is O(CO)O.

7 Claims, 15 Drawing Sheets

ELECTROLYTE COMPOSITIONS FOR LITHIUM AND LITHIUM-ION BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolytes for lithium and lithium-ion batteries. More specifically this invention relates to electrolytes comprising glycerol carbonate derivatives useful in lithium and lithium-ion batteries.

BACKGROUND OF THE INVENTION

Lithium and lithium ion batteries (collectively referred to herein as "lithium batteries") are playing an increasingly important role as power sources for electronic devices and electric vehicles. The electrolytes currently used in lithium batteries can limit their efficiency, cost, cycling characteristics, and useful lifetime. A wide electrochemical window, wide temperature stability range, non-reactivity with the other cell components, non-toxicity, low cost, and a lithium-ion transference number approaching unity are, in general, desirable characteristics for lithium battery electrolytes. In addition, the electrolyte should have excellent ionic conductivity to enable rapid ion transport between the electrodes, and be an electronic insulator to minimize self-discharge and prevent short-circuits within the cell. Various carbonate solvents such as dimethyl carbonate (DMC), ethyl methyl carbonate (EMC), ethylene carbonate (EC), propylene carbonate (PC), and mixtures of two or more of such carbonates, have been utilized as a solvent for lithium salts in lithium batteries and lithium-ion batteries.

Glycerol carbonate (GC) has been examined of use in electrolytes for lithium batteries (see co-pending application Ser. No. 12/910,549, filed Oct. 22, 2010, which is incorporated herein by reference in its entirety). While glycerol carbonate provides certain advantages when incorporated as a solvent or co-solvent in electrolyte formulations, the free hydroxyl group can be oxidized under cycling conditions, which can adversely affect cell performance.

There is an ongoing need for new electrolytes and functional electrolyte additives to improve cell life, thermal abuse behavior and low-temperature (e.g., <0° C.) performance of lithium-ion cells. The present invention addresses this need.

SUMMARY OF THE INVENTION

In one embodiment, the present invention provides an electrolyte for lithium and lithium-ion batteries comprising a lithium salt in a liquid carrier containing a glycerol carbonate (GC) derivative and at least one a linear alkyl carbonate solvent, cyclic alkyl carbonate solvent, or a combination thereof.

Because production of GC is prepared from a byproduct of another chemical process, it affords a potentially low-cost starting material for new solvents and additives for lithium and lithium-ion batteries. In addition to cost, safety considerations (behavior under thermal abuse and overcharge conditions) have limited the widespread commercialization of lithium batteries for transportation applications. With their low vapor pressure, many GC derivatives are less flammable than EC and PC, and thus provide superior safety characteristics when used in lithium and lithium-ion cells.

In one embodiment, an electrolyte composition of the present invention comprises a lithium salt in a liquid carrier comprising (a) a linear alkyl carbonate solvent, a cyclic alkylene carbonate solvent, or a combination thereof; and (b) a glycerol carbonate derivative compound of Formula (I):

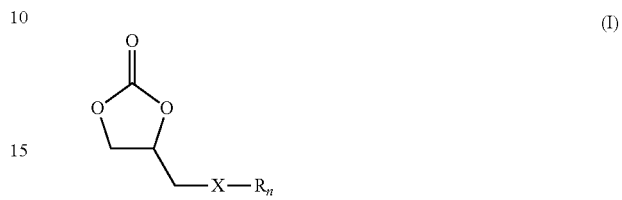

(I)

wherein X is selected from O, O(CO)O, S, N, P, P(=O), B, and Si; n is 1 when X is O, O(CO)O, or S; n is 2 when x is N, P, P(=O), or B; n is 3 when X is Si; and each R independently is alkyl, alkenyl, alkynyl, aryl, acyl, heteroaryl, a 5-member ring heterocyclic group, a 5-member ring heterocycle-substituted methyl group, trialkylsilyl, or any of the foregoing groups substituted with one or more fluoro substituents, provided that R is acyl only when X is O, S, or N, and R is not alkyl when X is O(CO)O. In some preferred embodiment, X is O and R is ($C_1$ to $C_6$)alkyl, ($C_1$ to $C_6$)alkenyl, ($C_1$ to $C_6$)acyl, or trialkylsilyl; or X is O(CO)O and R is ethylene carbonate-substituted methyl.

Another embodiment of the electrolyte composition of the present invention comprises $LiB(C_2O_4)_2$ or $LiPF_6$ in a liquid carrier comprising a glycerol carbonate derivative compound of Formula (I) wherein X is O or OC(CO)O; n is 1; and each R independently is alkyl, alkenyl, alkynyl, aryl, acyl, heteroaryl, a 5-member ring heterocyclic group, a 5-member ring heterocycle-substituted methyl group, trialkylsilyl, or any of the foregoing alkyl, alkenyl, alkynyl, aryl, acyl, heteroaryl, a 5-member ring heterocyclic group, a 5-member ring heterocycle-substituted methyl group, or trialkylsilyl groups substituted with one or more fluoro substituents, provided that R is not alkyl when X is O(CO)O; and optionally comprising a linear alkyl carbonate (e.g., dimethyl carbonate or ethyl methyl carbonate), a cyclic alkylene carbonate (e.g., ethylene carbonate or propylene carbonate), or a combination thereof. Preferably, R is alkyl (e.g., ($C_1$ to $C_6$)alkyl, such as methyl or ethyl) in this embodiment. In other preferred embodiments, X is O and R is ($C_1$ to $C_6$)alkyl, ($C_1$ to $C_6$)alkenyl, ($C_1$ to $C_6$)acyl, or trialkylsilyl; or X is O(CO)O and R is ethylene carbonate-substituted methyl.

In yet another embodiment, the electrolyte composition comprises a lithium salt in a liquid carrier comprising (a) a linear alkyl carbonate, a cyclic alkylene carbonate, or a combination thereof; and (b) a glycerol carbonate derivative compound of Formula (I) wherein X is O, n is 1, and R is alkyl (e.g., ($C_1$ to $C_6$)alkyl), acyl (e.g., ($C_1$ to $C_6$)acyl), or trialkylsilyl; or X is O(CO)O and R is ethylene carbonate-substituted methyl.

In another aspect, the present invention provides electrochemical cells comprising an anode, a cathode, and an electrolyte of the invention as described herein in contact with the anode and the cathode.

BRIEF DESCRIPTION OF THE DRAWINGS

FIG. 1, Panel (b) provides a graph of capacity versus cycle number obtained with the three GC derivatives (GCEE, GCME and GCnBE).

FIG. 2, Panel (b) provides a graph of capacity versus cycle number obtained with the three GC derivatives (GCEE, GCME and GCnBE).

FIG. 4, Panel (b) provides a graph of capacity versus cycle number obtained with GCEE and GCME.

FIG. 8, Panel (b) provides a graph of capacity versus cycle number for discharge cycles up to 20 cycles obtained with the GCME, GCEE, and GCnBE in lithium half cells with Gen2 cathode (3 to 4.3 V cycle range, C/20 charging rate).

DETAILED DESCRIPTION OF THE PRESENT INVENTION

Figure 1:
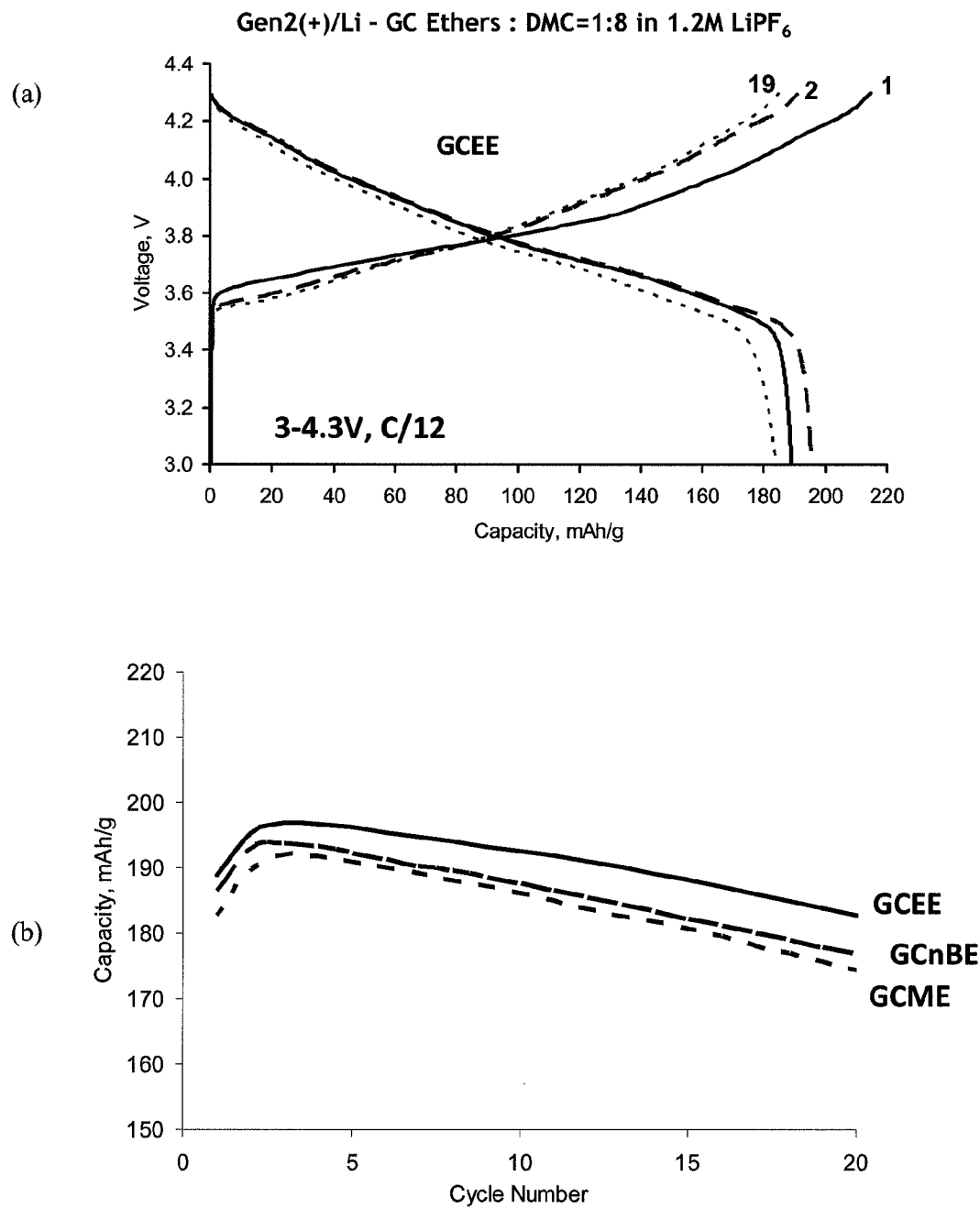
FIG. 1, Panel (a) provides a graph of voltage (V) versus capacity (mAh/g) for cycles 1, 2, and 19 over a range of about 3 to 4.3 V at C/12 charging rate obtained with the GCEE in a lithium half cell with Gen2 cathode.

The present invention provides new electrolyte compositions for use in lithium and lithium ion batteries. In a first embodiment, the composition comprises a lithium salt in a liquid carrier comprising (a) a linear alkyl carbonate, a cyclic alkylene carbonate, or a combination thereof; and (b) the glycerol carbonate derivative compound of Formula (I):

(I)

as described above, in which X can be O, O(CO)O, S, N, P, P(=O), B, or Si. The value of n depends on the valence of X, i.e., n is 1 when X is O, O(CO)O, or S; n is 2 when x is N, P, P(=O), or B; and n is 3 when X is Si. Each R group independently can be alkyl, alkenyl, alkynyl, aryl, acyl, heteroaryl, a 5-member ring heterocyclic group, a 5-member ring heterocycle-substituted methyl group, or trialkylsilyl. The R group also can be substituted with one or more fluoro substituents (i.e., replacing a hydrogen). R is acyl only when X is O, S, or N, and R is not alkyl when X is O(CO)O.

Non-limiting examples of alkyl groups include ($C_1$ to $C_6$)alkyl (e.g., methyl, ethyl, 1-propyl, 2-propyl, 1-butyl, 2-butyl, and tert-butyl) and similar materials.

Non-limiting examples of alkenyl groups include ($C_2$ to $C_6$)alkenyl (e.g., allyl) and similar materials.

Non-limiting examples of alkynyl groups include ($C_2$ to $C_6$)alkynyl (e.g., propargyl) and similar materials.

Non-limiting examples of aryl groups include phenyl, naphthyl, and ($C_1$ to $C_6$)alkyl-substituted phenyl or naphthyl, and similar materials.

Non-limiting examples of heteroaryl groups include furan, pyran, thiophene, pyridine, and similar materials.

Non-limiting examples of acyl groups include ($C_1$ to $C_6$)acyl (e.g., acetyl, propionyl, butyryl, and similar materials), benzoyl, ($C_1$ to $C_6$)alkyl-substituted benzoyl, and similar materials.

Non-limiting examples of 5-membered ring heterocyclic groups include cyclic ethylene carbonate, and similar materials.

Non-limiting examples of 5-membered ring heterocycle-substituted methyl groups include methyl groups substituted by a cyclic ethylene carbonate, a cyclic vinylidene carbonate, and similar materials. One preferred such GC derivative is the compound of Formula (II):

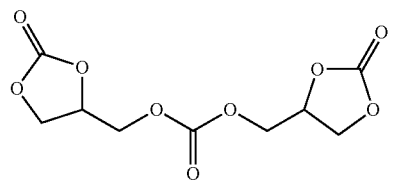

(II)

referred to herein as di-glycidyl carbonate (DGC).

Non-limiting examples of trialkylsilyl groups include trimethylsilyl, triethylsilyl, triarylsilyl, and similar materials.

Lithium salts useful in the electrolyte composition of this first embodiment include any lithium salt suitable for use in lithium batteries. Non-limiting examples of such salts include $LiF_2BC_2O_4$, $LiPF_6$, $LiBF_4$, and $LiB(C_2O_4)_2$. Preferably, the lithium salt in this first embodiment is present at a concentration in the range of about 0.1 to about 5 M, e.g., typically about 1 to about 1.5 M.

The carbonate solvent in the first embodiment can include any linear alkyl carbonate or cyclic alkylene carbonate or combination thereof, e.g., one or more carbonates selected from the group consisting of ethylene carbonate, propylene carbonate, dimethyl carbonate, and ethyl methyl carbonate.

In one preferred composition of the first embodiment, X is O, and R is ($C_1$ to $C_6$)alkyl (e.g., methyl, ethyl, 1-propyl, 2-propyl, 1-butyl, 2-butyl, or tert-butyl) or ($C_1$ to $C_6$)alkenyl (e.g., allyl, 3-(2-methyl-1-propenyl, and similar materials). In another preferred composition, X is O, and R is ($C_1$ to $C_6$)acyl (e.g., acetyl, n-propionyl, n-butyryl, and the like).

The compound of Formula (I) preferably is present in the liquid carrier at a concentration in the range of about 0.1 to 50 percent by weight based on the total weight of the liquid carrier.

In one particularly preferred example, the electrolyte composition comprises about 1.2 M LiPF6 in a liquid carrier comprising ethylene carbonate and ethyl methyl carbonate in a weight ratio of about 3:7 and about 0.1 to 10 percent by weight (preferably about 3 to 5 percent by weight) of the compound of Formula (I), based on the total weight of the liquid carrier.

A second embodiment of the electrolyte composition of the present invention comprises $LiB(C_2O_4)_2$ (i.e., LiBOB) or $LiPF_6$ in a liquid carrier comprising a glycerol carbonate derivative compound of Formula (I) wherein X is O or O(CO)O; n is 1; and each R independently is alkyl, alkenyl, alkynyl, aryl, acyl, heteroaryl, a 5-member ring heterocyclic group, a 5-member ring heterocycle-substituted methyl group, trialkylsilyl, or any of the foregoing alkyl, alkenyl, alkynyl, aryl, acyl, heteroaryl, a 5-member ring heterocyclic group, a 5-member ring heterocycle-substituted methyl group, or trialkylsilyl groups substituted with one or more fluoro substituents, provided that R is not alkyl when X is O(CO)O; and the liquid carrier optionally comprises a linear alkyl carbonate, a cyclic alkylene carbonate, or a combination thereof. In this embodiment, R preferably is alkyl. Preferably, the lithium salt is present at a concentration in the range of about 0.1 to about 5 M, more preferably about 0.3 to 1.2 M. Preferred alkyl groups include methyl, ethyl, propyl, isopropyl, isobutyl (2-butyl), n-butyl (1-butyl), and tert-butyl.

In yet another embodiment, the electrolyte composition of the invention comprises a lithium salt in a liquid carrier comprising (a) a linear alkyl carbonate solvent, a cyclic alkyl carbonate solvent, or a combination thereof; and (b) a glycerol carbonate derivative compound of Formula (I) wherein X is O, n is 1, and R is alkyl, acyl or trialkylsilyl; or X is O(CO)O and R is ethylene carbonate-substituted methyl. Preferred alkyl groups include ($C_1$ to $C_6$)alkyl. Preferred acyl groups include ($C_1$ to $C_6$)acyl. Examples of linear alkyl carbonates include ethyl methyl carbonate and dimethyl carbonate, and examples of cyclic alkylene carbonate solvents include propylene carbonate and ethylene carbonate. Dimethyl carbonate is preferred, particularly in an 8:1 weight ratio to the compound of Formula (I).

Optionally, the liquid carrier of any of the embodiments of the electrolyte compositions of this invention can include vinylidene carbonate as an additive, e.g., at a concentration in the range of about 0.1 to about 10 percent by weight (e.g., about 0.1 to about 5 percent by weight) based on the total eight of the liquid carrier.

The electrolyte compositions of the present invention are particularly useful in an electrochemical cell in combination with an anode and a cathode. A preferred anode comprises graphite or lithium metal. A preferred cathode comprises a lithium compound (e.g., a lithium-bearing layered oxide compound such as $LiNi_{0.8}Co_{0.15}Al_{0.05}O_2$). A battery of the present invention comprises a plurality of such electrochemical cells arranged in series, in parallel, or both. One preferred cell configuration comprises an approx. 35 micron coating of $LiNi_{0.8}Co_{0.15}Al_{0.05}O_2$ on an aluminum collector foil as the cathode, an approx. 35 micron coating of particulate graphite (about 5 micron particle size) on a copper collector foil as the anode, an approx. 25 micron thick porous polyolefin separator, and an electrolyte comprising about 1.2 M $LiPF_6$ in a carrier comprising ethylene carbonate and ethyl methyl carbonate in a 3:7 weight ratio (collectively referred to as a "Gen2" cell for convenience) and further comprising a compound of Formula (I) (e.g., about 0.1 to about 10 percent by weight).

The following non-limiting examples are provided to better illustrate certain aspects of the present invention.

Example 1

Electrolyte compositions comprising 1.2 M $LiPF_6$ in a 1:8 (w/w) mixture of GC ether derivative of Formula (I) and DMC were prepared. In the GC ether derivatives used, X═O, and R═ethyl (GCEE), butyl (GCnBE), methyl (GCME). The electrolytes were evaluated in lithium half cells with the Gen2 cathode or with the Gen2 anode, and in full cells containing the Gen2 cathode and the Gen2 anode.

FIG. 1, Panel (a) provides a graph of voltage (V) versus capacity (mAh/g) for cycles 1, 2, and 19 over a range of about 3 to 4.3 V at C/12 charging rate obtained with the GCEE in a lithium half cell with Gen2 cathode. FIG. 1, Panel (b) provides a graph of capacity versus cycle number obtained with the three GC derivatives (GCEE, GCME and GCnBE). The data in FIG. 1 show that there was a good first cycle coulombic efficiency (about 88%) and reversible capacity for GCEE, comparable to that of the Gen2 electrolyte (about 180 mAh/g).

Figure 2:
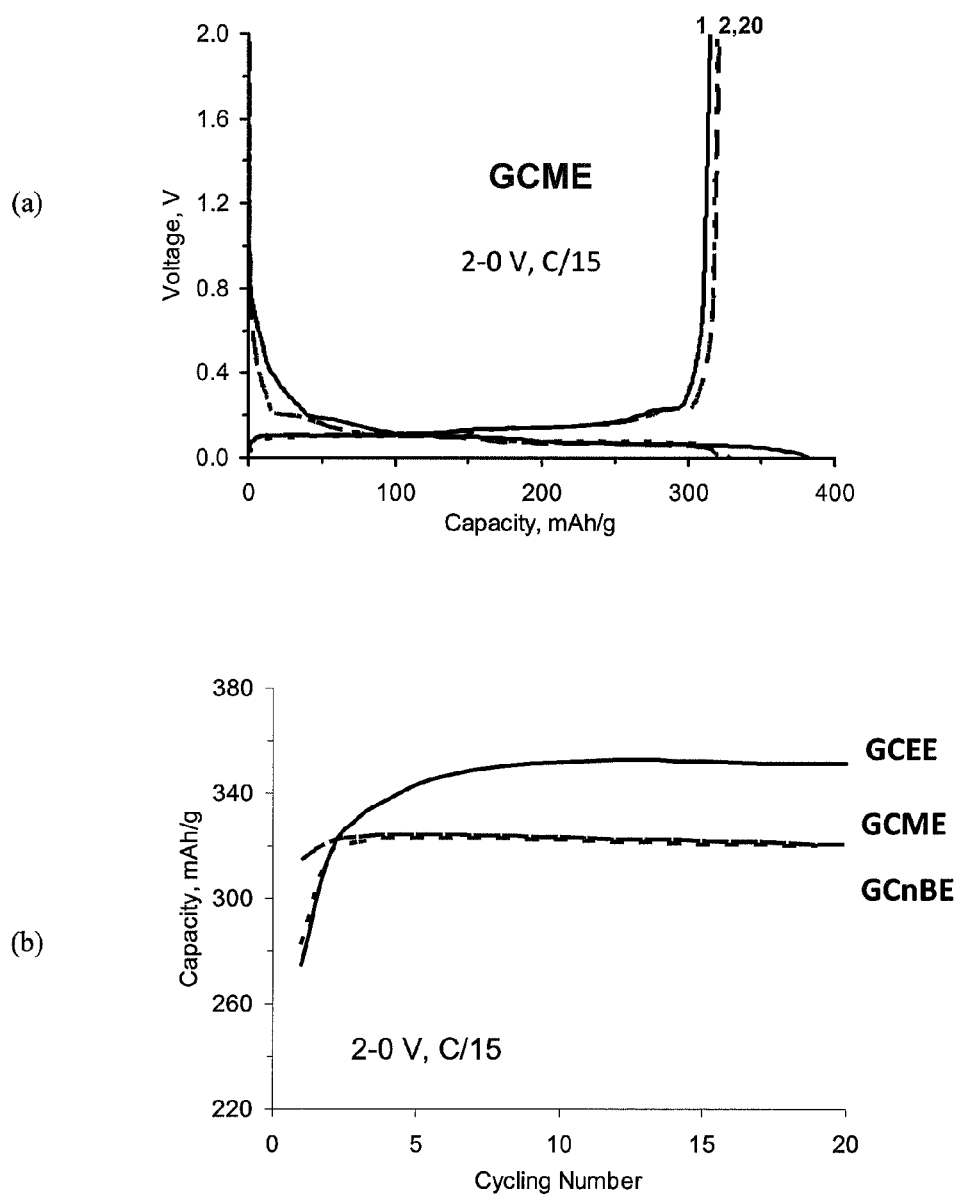
FIG. 2, Panel (a) provides a graph of voltage versus capacity for cycles 1, 2, and 20 over a range of about 2 to 0 V at C/15 charging rate obtained with the GCME in a lithium half cell with Gen2 anode.

FIG. 2, Panel (a) provides a graph of voltage versus capacity for cycles 1, 2, and 20 over a range of about 2 to 0 V at C/15 charging rate obtained with the GCME in a lithium half cell with Gen2 anode. FIG. 2, Panel (b) provides a graph of capacity versus cycle number obtained with the three GC derivatives (GCEE, GCME and GCnBE). The data in FIG. 2 show that there was a good 1st cycle coulombic efficiency (about 85%) and good reversible capacity in the GC derivative electrolytes comparable to that of the Gen2 electrolyte (about 320 mAh/g).

Figure 3:
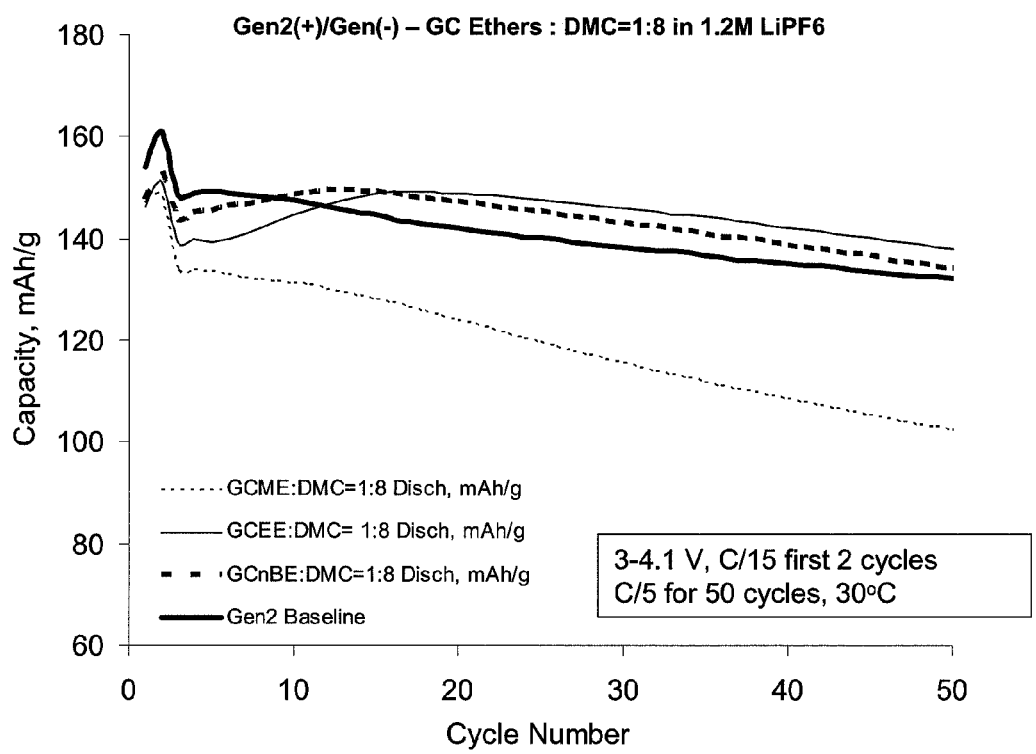
FIG. 3 provides a graph of capacity versus cycle number for electrolytes containing GCEE, GCME or GCnBE compared to Gen2 electrolyte without the GC derivative. The data were obtained in full cells containing a Gen2 cathode and a Gen2 anode over the 3 to 4.1V range, with a C/15 charging rate for the first 2 cycles, and a C/5 charging rate for the following cycles.

The electrolytes were also evaluated in a full cell with a Gen2 cathode and a Gen2 anode (3 to 4.1 V, C/15 charging rate for the first 2 cycles, C/5 charging rate for the remaining 50 cycles; 30° C.). FIG. 3 provides a graph of capacity versus cycle number for electrolytes containing GCEE, GCME or GCnBE compared to Gen2 electrolyte without the GC derivative. The cyclic performance of cells with CGEE and GCnBE were comparable to that of cells with Gen2 electrolyte.

Example 2

Electrolyte compositions comprising 1.2 M $LiPF_6$ in pure GC ether derivatives of Formula (I) were prepared. In the GC derivatives used X=O, and R=ethyl (GCEE), methyl (GCME), isopropyl (GCiPE), n-butyl (GCnBE), isobutyl (GCiBE), and tert-butyl (GCiBE). The electrolytes were evaluated in lithium half cells with the Gen2 cathode or with the Gen2 anode.

Figure 4:
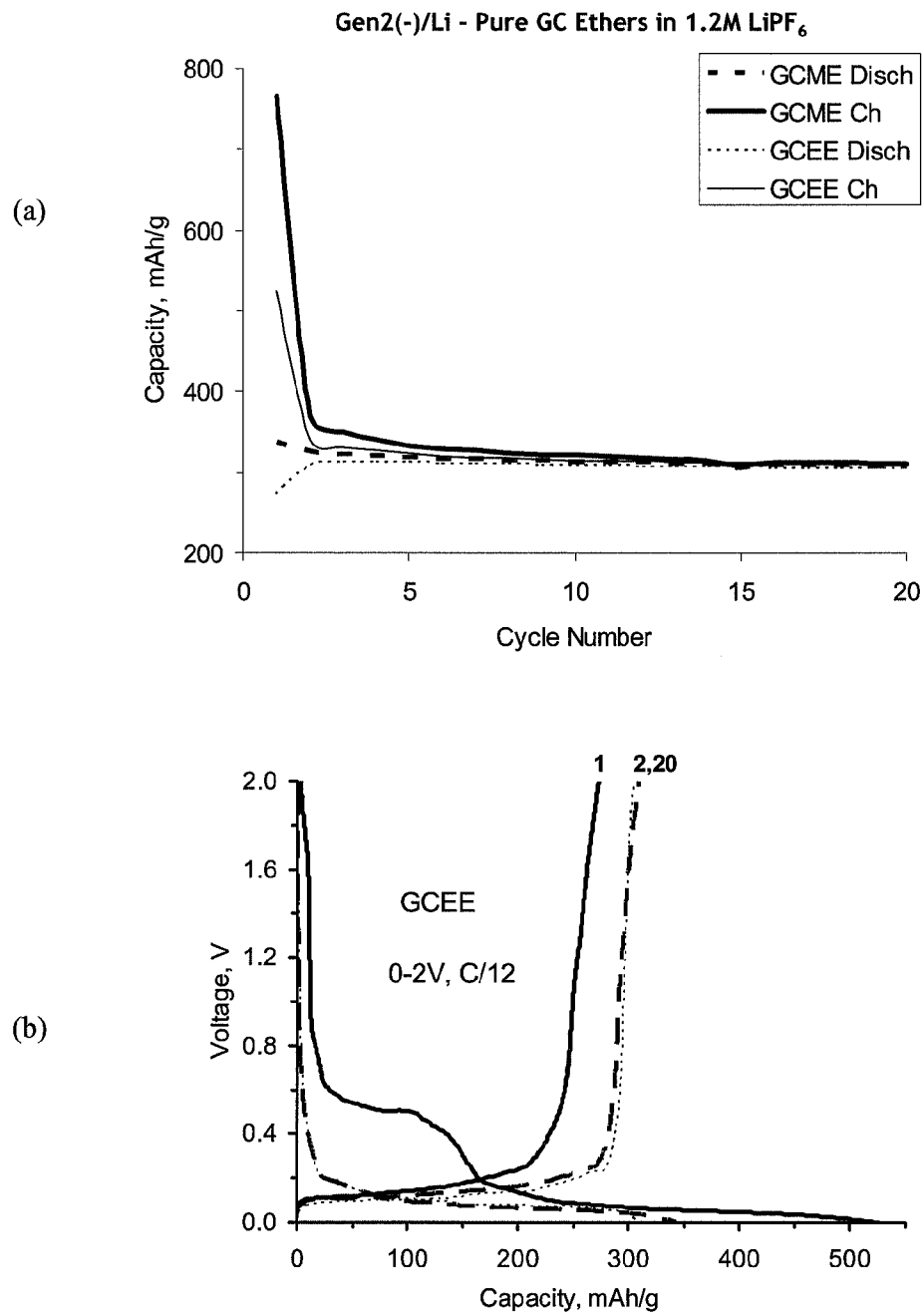
FIG. 4, Panel (a) provides a graph of voltage versus capacity for cycles 1, 2, and 20 obtained with the GCEE in a lithium half cell with Gen2 anode (2 to 0 V cycle range, C/12 charging rate).

FIG. 4, Panel (a) provides a graph of voltage versus capacity for cycles 1, 2, and 20 obtained with the GCEE in a lithium half cell with Gen2 anode (2 to 0 V cycle range, C/12 charging rate). FIG. 4, Panel (b) provides a graph of capacity versus cycle number obtained with GCEE and GCME. The data in FIG. 4 show that the cell can be cycled with a graphite anode at about 300 mAh/g capacity, but the first cycle coulombic efficiency is relatively low.

Figure 5:
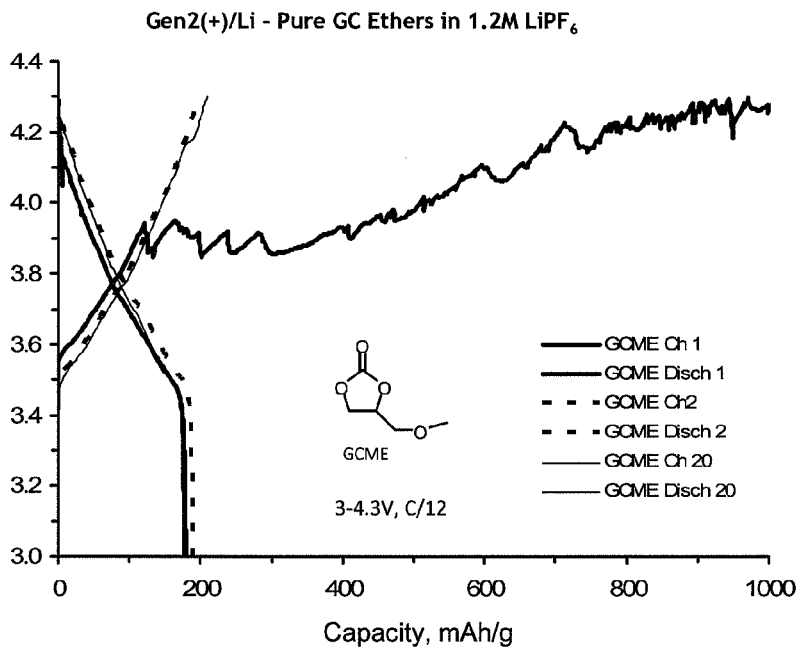
FIG. 5 provides a graph of voltage versus capacity for cycles 1, 2, and 20 obtained with the GCME in a lithium half cell with Gen2 cathode (3 to 4.3 V cycle range, C/12 charging rate).

FIG. 5 provides a graph of voltage versus capacity for cycles 1, 2, and 20 obtained with the GCME in a lithium half cell with Gen2 cathode (3 to 4.3 V cycle range, C/12 charging rate). The data in FIG. 5 show that the electrolyte begins to decompose around 4 V and that the surface passivation process is quite long. Once a protective film was formed, the cell cycled with good reversible capacity (about 175 mAh/g). Similar behavior was observed for GCEE.

Figure 6:
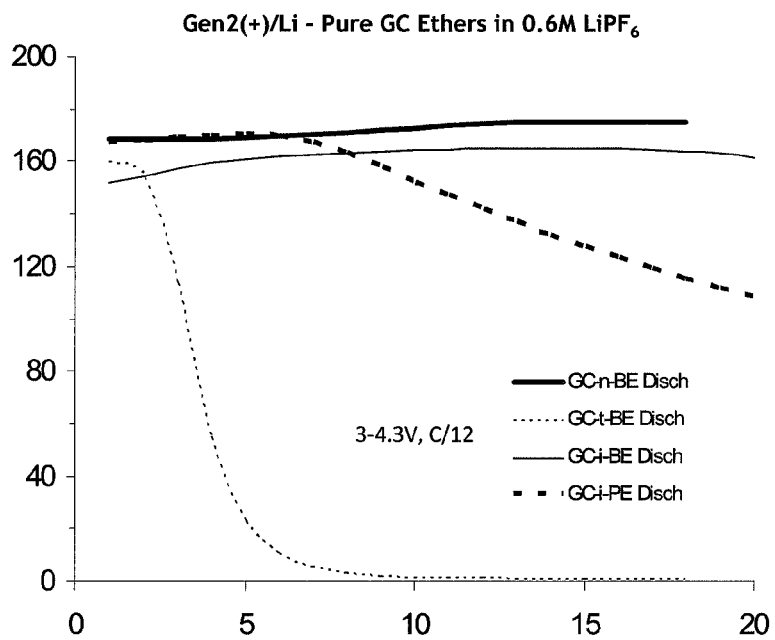
FIG. 6 provides a graph of capacity versus cycle number for electrolytes comprising GCnBE, GCtBE, GCiBE and GCiPE over 18 cycles in a lithium half cell with Gen2 cathode (3 to 4.3 V cycle range, C/12 charging rate).

FIG. 6 provides a graph of capacity (mAh/g) versus cycle number for electrolytes comprising GCnBE, GCtBE, GCiBE and GCiPE over 18 cycles in a lithium half cell with Gen2 cathode (3 to 4.3 V cycle range, C/12 charging rate). The data in FIG. 6 show that the coulombic efficiency for all of the electrolytes was about 82%, however, significant performance degradation was observed with GCtBE as the solvent. The linear alkyl GC ether derivatives surprisingly outperformed the branched alkyl derivatives in the Gen2 cathode half cell configuration.

Figure 7:
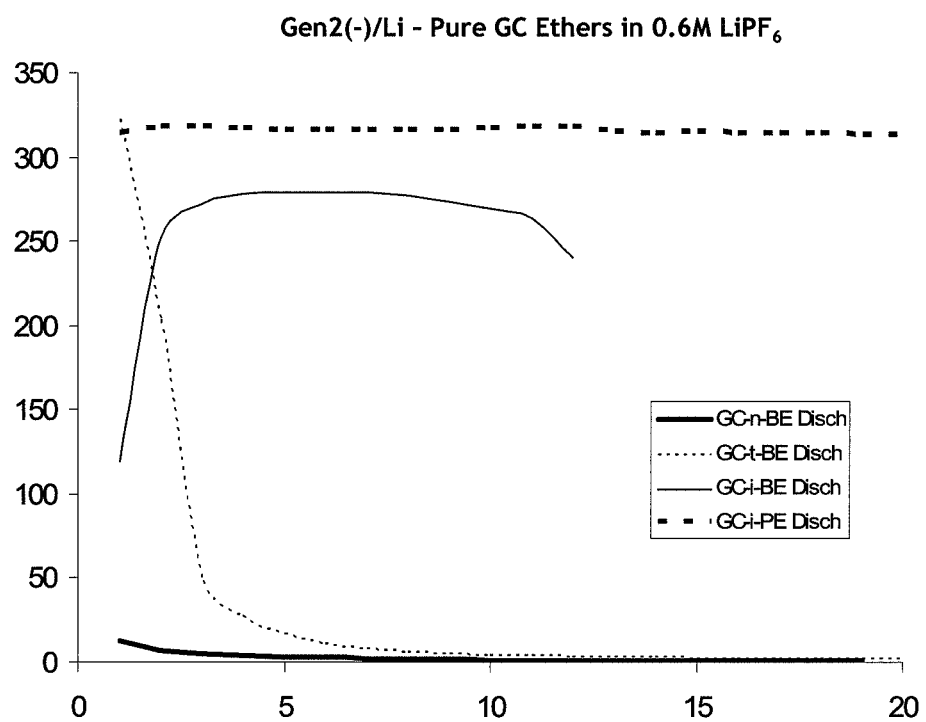
FIG. 7 provides a graph of capacity versus cycle number for electrolytes comprising GCnBE, GCtBE, GCiBE and GCiPE over 10 cycles in a lithium half cell with Gen2 anode (2 to 0 V cycle range, C/12 charging rate).

FIG. 7 provides a graph of capacity versus cycle number for electrolytes comprising GCnBE, GCtBE, GCiBE and GCiPE over 20 cycles in a lithium half cell with Gen2 anode (2 to 0 V cycle range, C/12 charging rate). The data in FIG. 7 show that the secondary branched alkyl GC ether derivatives (GCiPE and GCiBE) surprisingly outperformed the linear and tertiary alkyl derivatives in the Gen2 anode half cell configuration.

Example 3

Electrolyte compositions comprising 0.3 M $LiB(C_2O_4)_2$ in pure GC ether derivatives of Formula (I) were prepared. In the GC derivatives used X=O, and R=ethyl (GCEE), methyl (GCME), isopropyl (GCiPE), n-butyl (GCnBE), isobutyl (GCiBE), and tert-butyl (GCiBE). The electrolytes were evaluated in lithium half cells with the Gen2 cathode or with the Gen2 anode, and in full cells containing the Gen2 cathode and the Gen2 anode.

Figure 8:
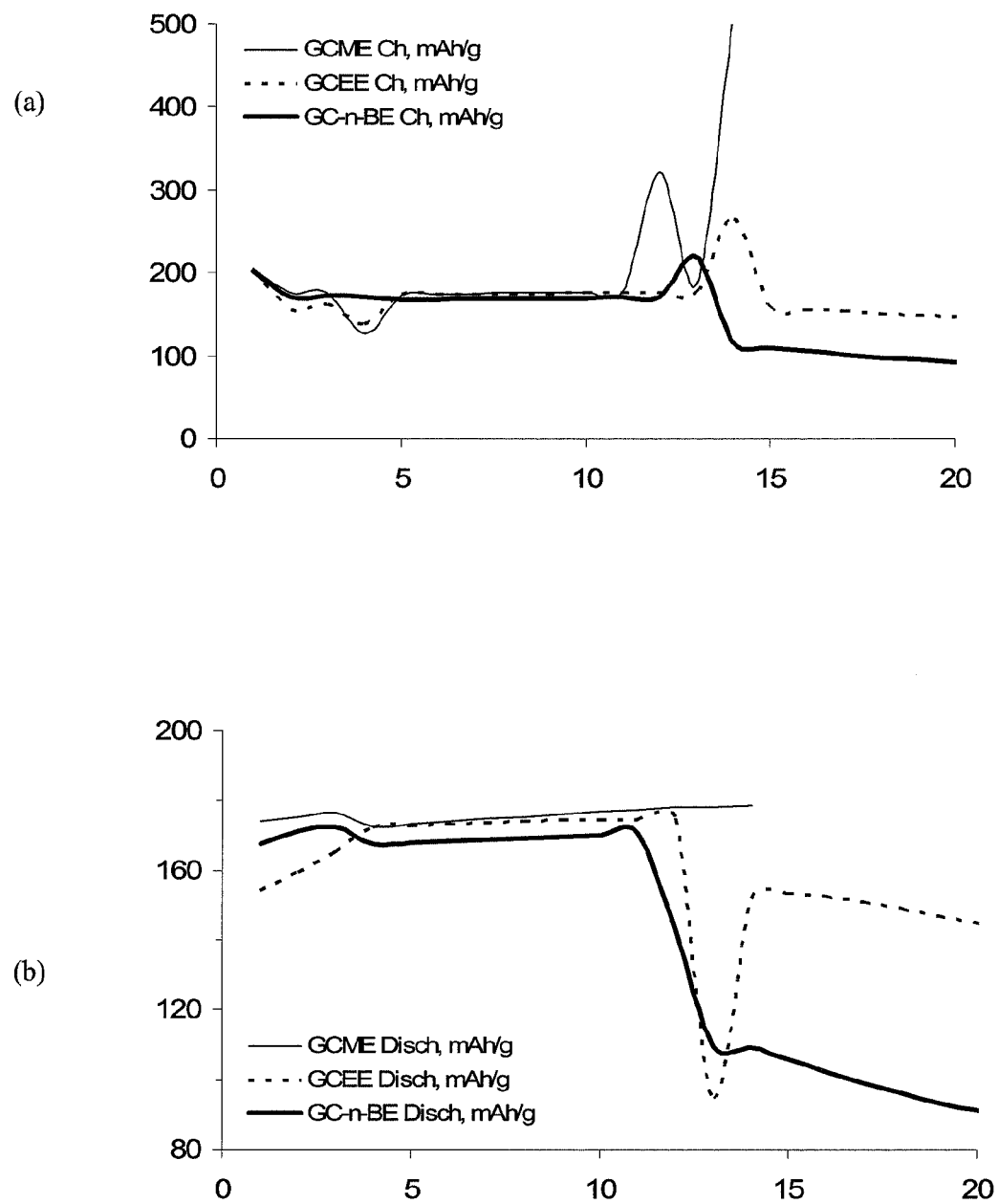
FIG. 8, Panel (a) provides a graph of capacity versus cycle number for charge cycles up to 20 cycles obtained with the GCME, GCEE, and GCnBE in lithium half cells with Gen2 cathode (3 to 4.3 V cycle range, C/20 charging rate) in an electrolyte with 0.3M lithium bus(oxalate)borate (LiBOB) salt.

FIG. 8, Panel (a) provides a graph of charge capacity versus cycle number for up to 20 cycles obtained with the GCME, GCEE, and GCnBE in lithium half cells with Gen2 cathode (3 to 4.3 V cycle range, C/20 charging rate). FIG. 8, Panel (b) provides a graph of discharge capacity versus cycle number for up to 20 cycles obtained with the GCME, GCEE, and GCnBE in lithium half cells with Gen2 cathode (3 to 4.3 V cycle range, C/20 charging rate). The GCME cell died after 14 cycles.

Figure 9:
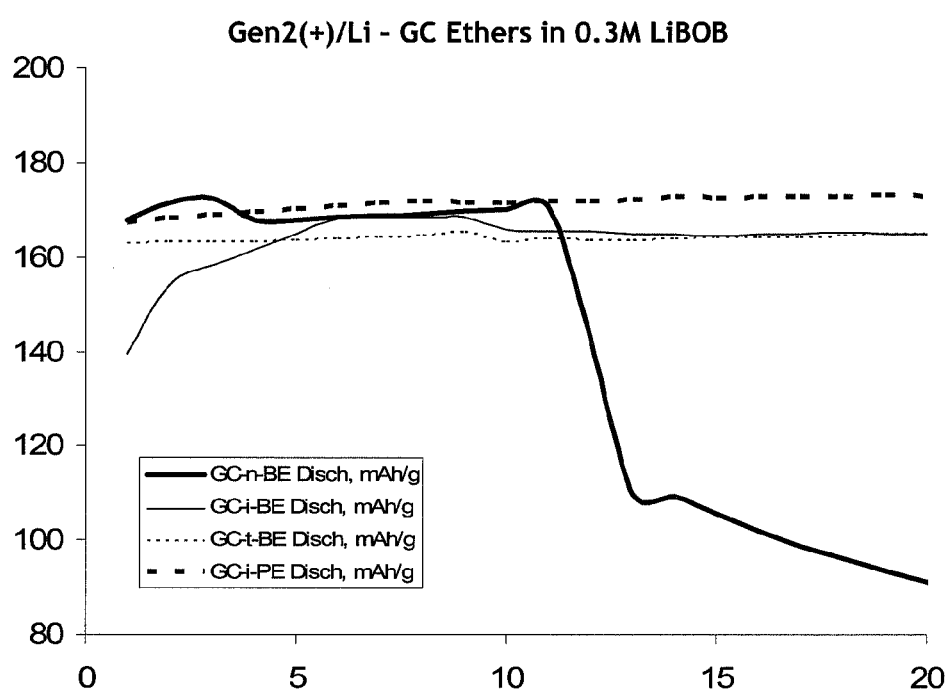
FIG. 9 provides a graph of capacity versus cycle number for charge cycles up to 20 cycles obtained with the GCiPE, GCiBE, GCtBE, and GCnBE in lithium half cells with Gen2 cathode (3 to 4.3 V cycle range, C/20 charging rate) in an electrolyte with 0.3M LiBOB salt.

FIG. 9 provides a graph of discharge capacity versus cycle number for up to 20 cycles obtained with the GCiPE, GCiBE, GCtBE, and GCnBE in lithium half cells with Gen2 cathode (3 to 4.3 V cycle range, C/20 charging rate). The branched ether derivatives exhibited lower initial capacity but better long-term cyclability compared to the linear alkyl derivative. The trend here is different than that observed with $LiPF_6$ in Example 2.

Figure 10:
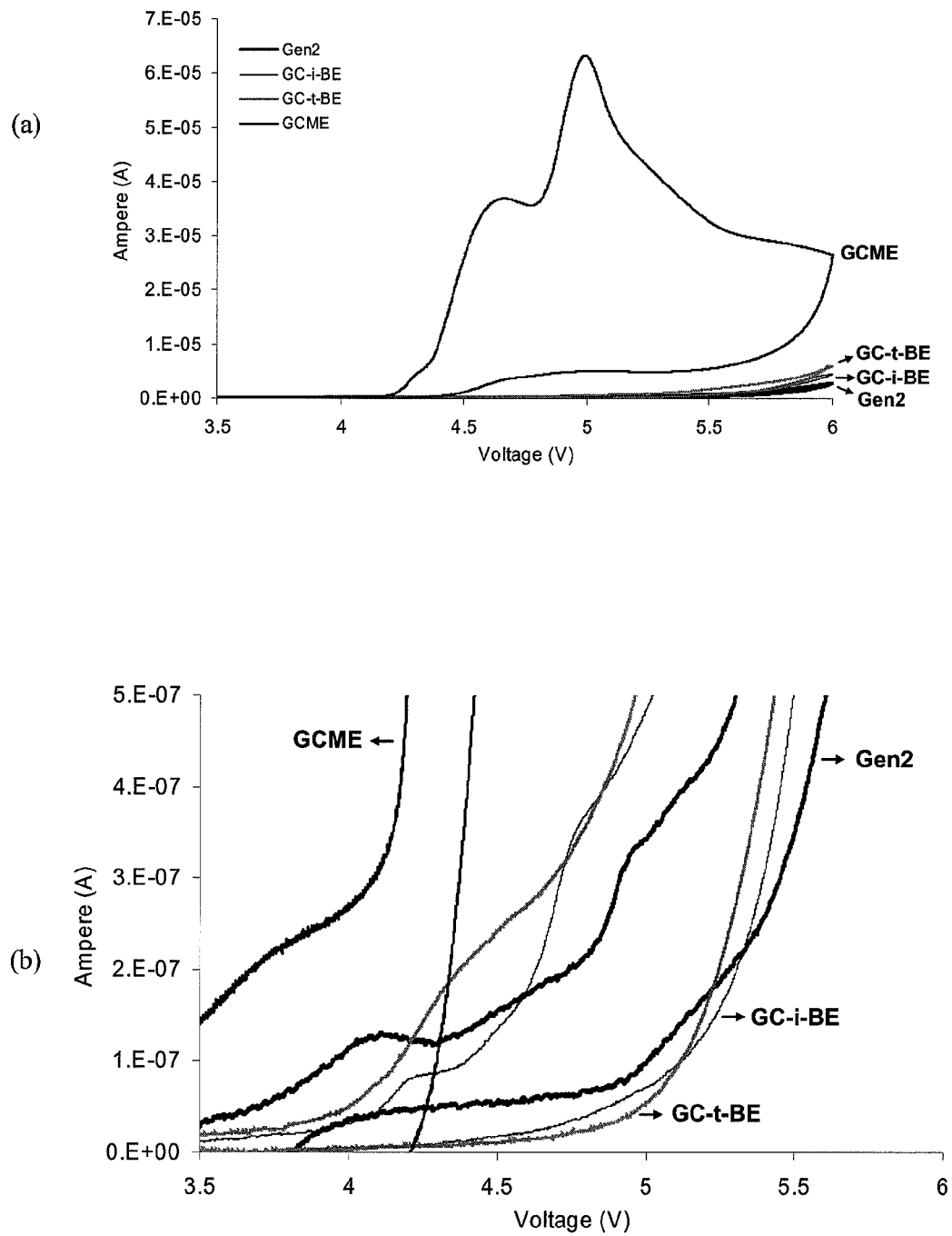
FIG. 10, Panel (a) provides a plot of cyclic voltammetry measurements performed with electrolytes comprising GCiBE, GCME, and GCtBE, with a platinum working electrode, and lithium metal as the counter electrode and the reference electrode at a scan rate of 1 mVs$^{-1}$. Panel (b) provide an expansion of the plot along the Y-axis.

Cyclic voltammetry measurements were performed for the electrolytes comprising GCiBE, GCME, and GCtBE, with a platinum working electrode, and lithium metal as the counter electrode and the reference electrode at a scan rate of about 1 $mVs^{-1}$. The results, shown in FIG. 10, indicate that GCME oxidizes at a lower potential than GCiBE and GCtBE.

Figure 11:
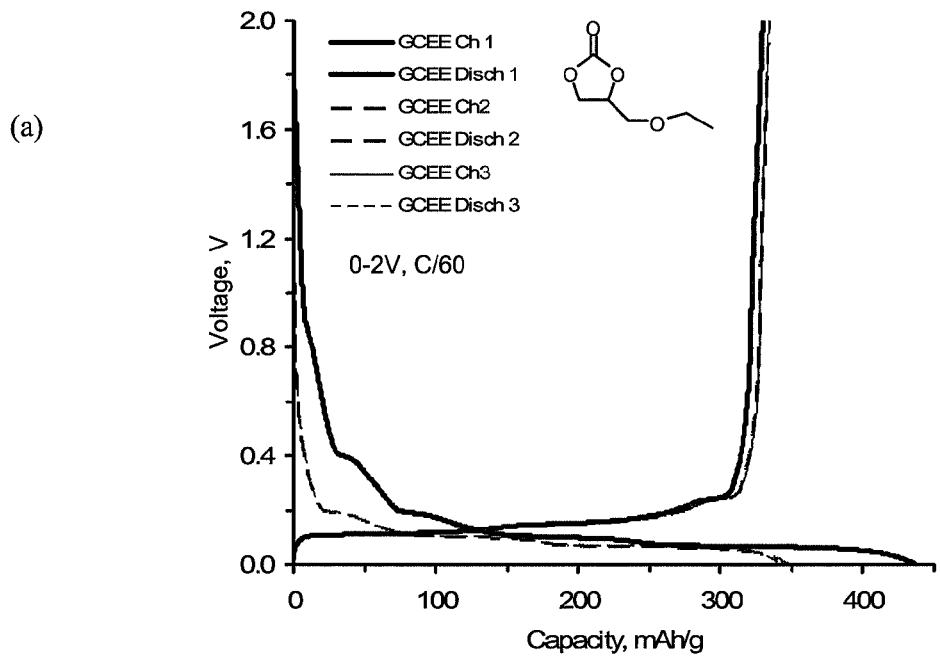
FIG. 11, Panel (a) provides a plot of voltage versus capacity for the first three charge-discharge cycles obtained with an electrolyte comprising GCEE in a lithium half cell with the Gen2 anode over a voltage range of about 2 to 0 V, at C/60 charging rate. Panel (b) provides the dQ/dV versus voltage plot for the first two charge-discharge cycles of the same cell.
Figure 11:
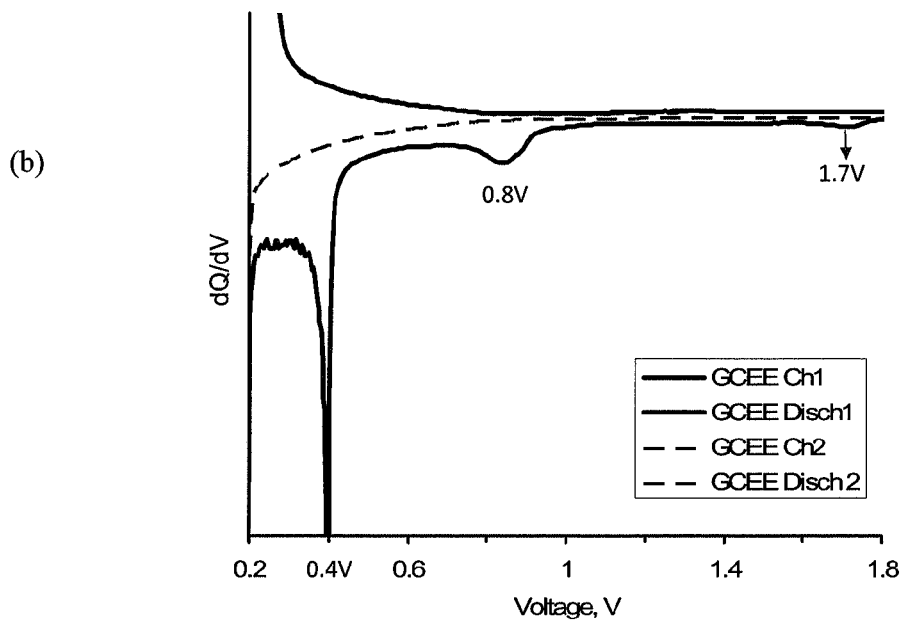

In addition, the electrolyte comprising GCEE was evaluated in a lithium half cell with the Gen2 anode over a voltage range of about 2 to 0 V, at C/60 charging rate. A plot of voltage versus capacity for the first three charge-discharge cycles is shown in FIG. 11, Panel (a). Very good reversible capacity (about 300 mAh/g) was achieved at the low C/60 charging rate. A Plot of dQ/dV versus voltage, shown in FIG. 11, Panel (b), shows solid electrolyte interphase (SEI) formation peaks at about 1.7, 0.8, and 0.4 V, which correspond to the decomposition of borate, carbonate, and the ether group of the GC ether derivative, respectively.

Figure 12:
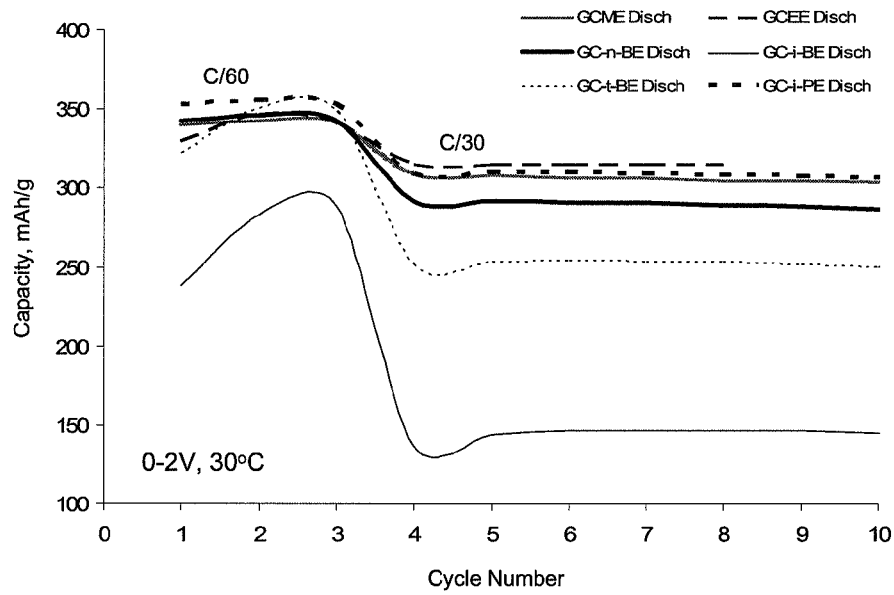
FIG. 12 provides a graph of capacity versus cycle number for the discharge cycles observed with electrolytes containing GCME, GCnBE, GCtBE, GCEE, GCiBE and GCiPE in lithium half cells with the Gen2 anode (0 to 2 V range, 30° C., at C/60 or C/30 charging rate).

The performance of the electrolytes containing GCME, GCnBE, GCtBE, GCEE, GCiBE and GCiPE were further evaluated in lithium half cells with the Gen2 anode (0 to 2 V range, 30° C., at C/60 or C/30 charging rate). FIG. 12 provides a graph of capacity versus cycle number for the discharge cycles observed with these electrolytes. The linear alkyl GC ether derivatives outperformed the branched alkyl derivatives except in the case of GCiPE. This trend is different from that of the positive half cell data trend shown previously in FIG. 9.

Figure 13:
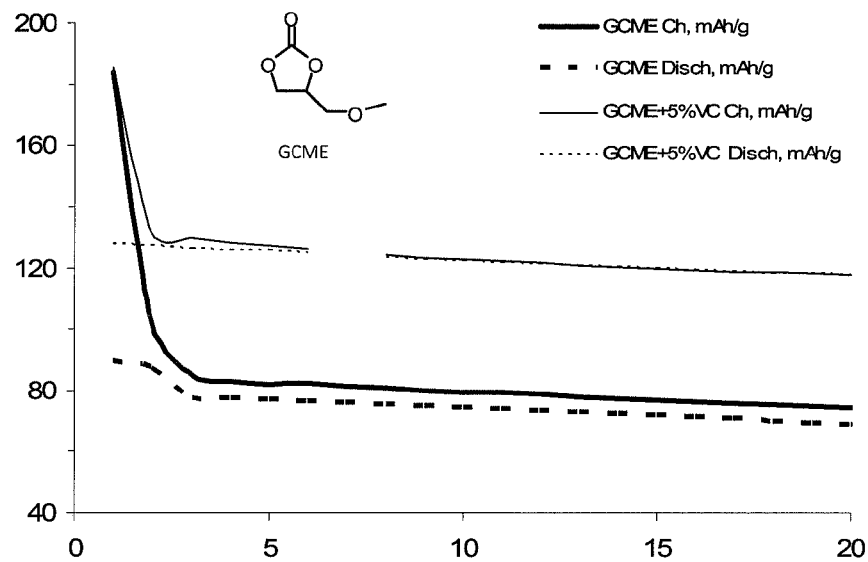
FIG. 13 provides a graph of capacity versus cycle number for an electrolyte containing GCME and 0.3M LiBOB, with and without added vinylidene carbonate (VC) at a 5 percent by weight (wt %) concentration, in a full cell with the Gen2 anode and the Gen2 cathode.

The performance of the electrolyte containing GCME, with and without added vinylidene carbonate (VC) at a 5 percent by weight (wt %) concentration, was evaluated in a full cell with the Gen2 anode and the Gen2 cathode. FIG. 13 provides a graph of capacity versus cycle number. The observed discharge capacity was about 125 mAh/g when the VC was included in the electrolyte. VC considerably improved the cycle coulombic efficiency of the cell. The efficiency of the first cycle was about 49% without VC and about 69% with VC; whereas the second and later cycles were about 92% without VC and about 99% with VC.

Figure 14:
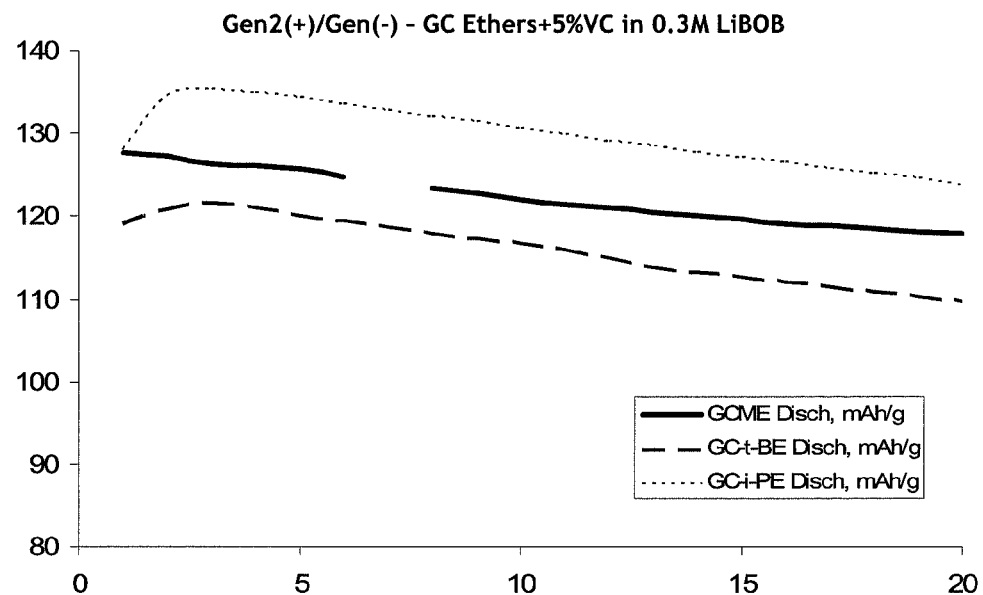
FIG. 14 shows a graph of capacity versus cycle number for the discharge cycles obtained in the full cell configuration used in FIG. 13, for electrolytes comprising GCME, GCtBE, and GCiPE solvents and 0.3M LiBOB salt, each with 5 wt % VC added.

FIG. 14 shows a graph of capacity versus cycle number for the discharge cycles obtained in the full cell configuration for electrolytes comprising GCME, GCtBE, and GCiPE, each with 5 wt % VC added. GCiPE provided the best performance in these evaluations, indicating that the length of the ether alkyl chain and the level of branching of the alkyl chain may be related to overall cycling performance.

In summary, Gen2 anodes (comprising synthetic graphite (Mag-10) from Hitachi Chemical) could be cycled in electrolytes comprising 0.3 M LiB($C_2O_4$)$_2$ in the pure GC ether derivatives as solvent. Linear alkyl ethers provided a better specific capacity than branched ethers, except in the case of GCiPE. The Gen2 oxide cathode (LiNi$_{0.8}$Co$_{0.15}$Al$_{0.05}$O$_2$) also was cyclable in the GC ether based electrolytes, but in contrast to the anode results, branched GC ether derivatives unexpectedly performed better than the linear derivatives. In addition, a full Gen2 anode/cathode cell also can be cycled in the 0.3 M LiB($C_2O_4$)$_2$/pure GC ether derivative electrolytes, and the capacity of the cells can be improved by the addition of vinylidene carbonate (e.g., about 5 wt %).

Example 4

Electrolytes were prepared based on the Gen2 electrolyte, i.e., EC:EME (3:7, w/w) and 1.2 M LiPF$_6$, further containing about 3 wt % of either di-glycidyl carbonate (DGC) or glycerol carbonate trimethylsilyl ether (GCTMSE). These electrolytes were evaluated in a full cell with a Gen2 cathode and a Gen2 anode.

Figure 15:
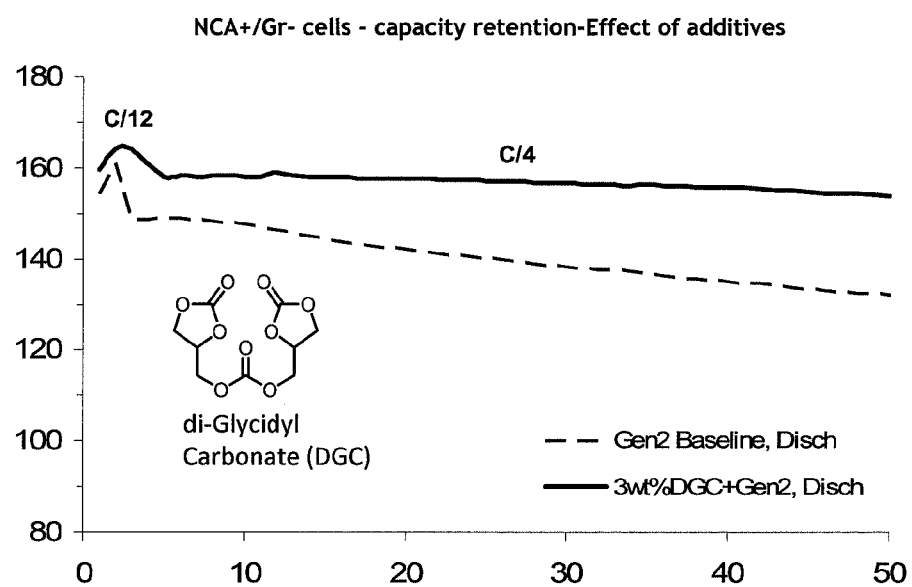
FIG. 15 provides a graph of discharge capacity versus cycle number for cells with Gen2 electrolyte, and with 3 wt % DGC added to the Gen2 electrolyte, over 50 cycles at C/4 charging rate over a 3 to 4.1V voltage range at 30° C.

FIG. 15 provides a graph of discharge capacity versus cycle number for the DGC electrolyte versus Gen2 electrolyte for comparison. The DGC-bearing electrolyte showed almost no capacity loss after 50 cycles at C/4 charging rate over a voltage range of 3 to 4.1 V at 30° C. surprisingly outperforming the Gen2 electrolyte.

Figure 16:
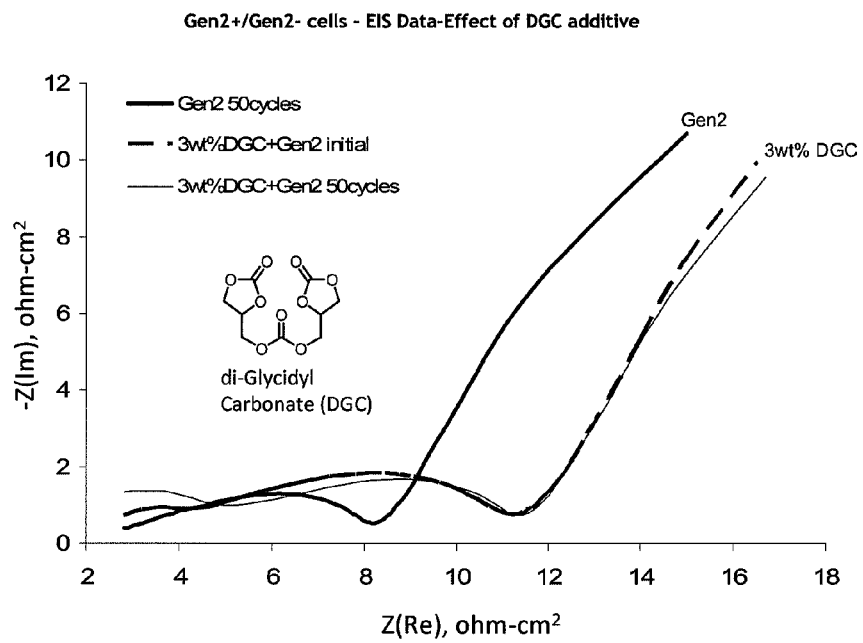
FIG. 16 provides an AC impedance plot, for the cells shown in FIG. 15, obtained at a full cell voltage of 3.72V, over a frequency range of 100 KHz to 0.01 Hz, at 30° C.

FIG. 16 provides an AC impedance plot for the DGC cell compared to the Gen2 cell. The DGC cell exhibited slightly higher impedance than the Gen2 cell, however, the impedance was unchanged after 50 cycles.

Figure 17:
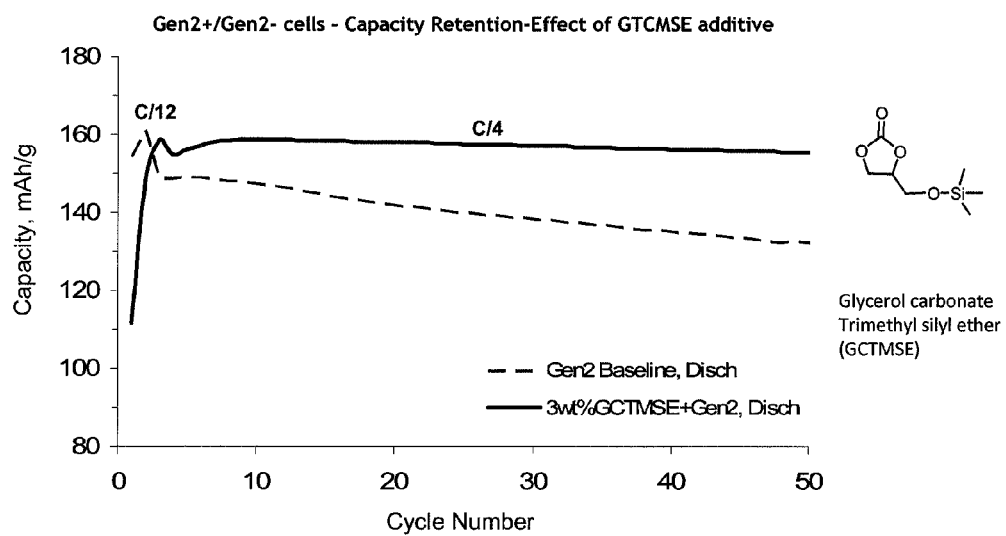
FIG. 17 provides a graph of discharge capacity versus cycle number for cells with Gen2 electrolyte, and with 3 wt % GCTMSE added to the Gen2 electrolyte, over 50 cycles at C/4 charging rate over a 3 to 4.1V voltage range at 30° C.

FIG. 17 provides a graph of discharge capacity versus cycle number for the GCTMSE electrolyte versus Gen2 electrolyte for comparison. The GCTMSE-bearing electrolyte showed almost no capacity loss after 50 cycles at C/4 charging rate over a voltage range of 3 to 4.1V at 30° C., surprisingly outperforming the Gen2 electrolyte.

Figure 18:
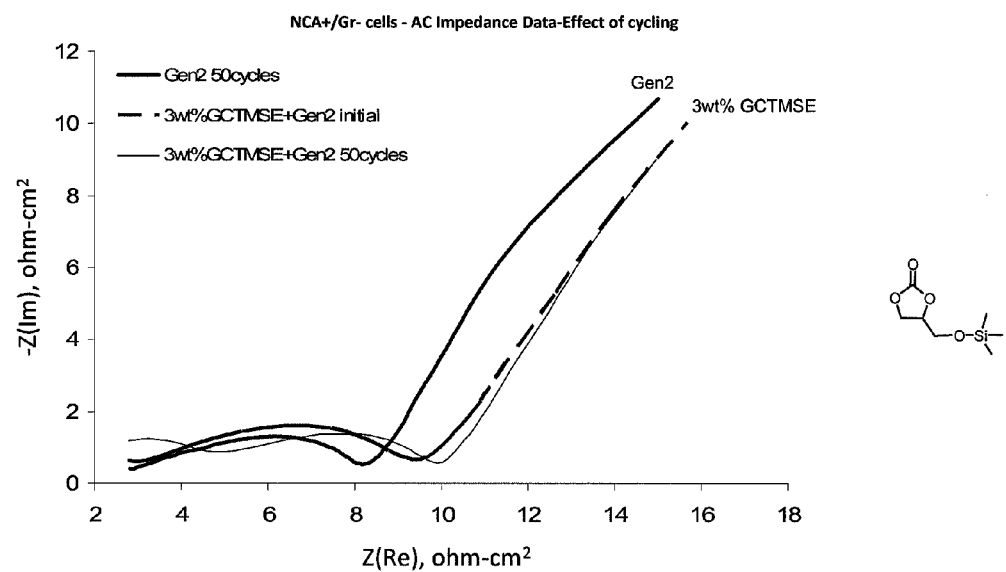
FIG. 18 provides an AC impedance plot, for the cells shown in FIG. 17, obtained at a full cell voltage of 3.72V, over a frequency range of 100 KHz to 0.01 Hz, at 30° C.

FIG. 18 provides an AC impedance plot for the GCTMSE cell compared to the Gen2 cell. The GCTMSE cell exhibited slightly higher impedance than the Gen2 cell, and the impedance increased only slightly after 50 cycles.

Electrochemical Cells.

Figure 19:
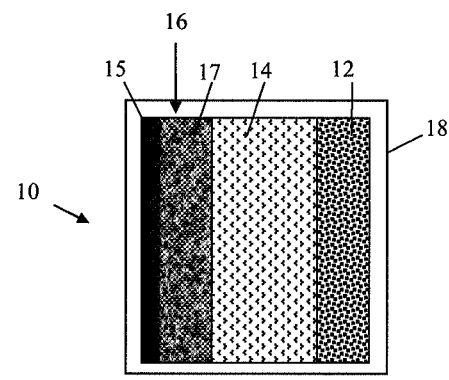
FIG. 19 schematically illustrates an electrochemical cell of the present invention.
Figure 20:
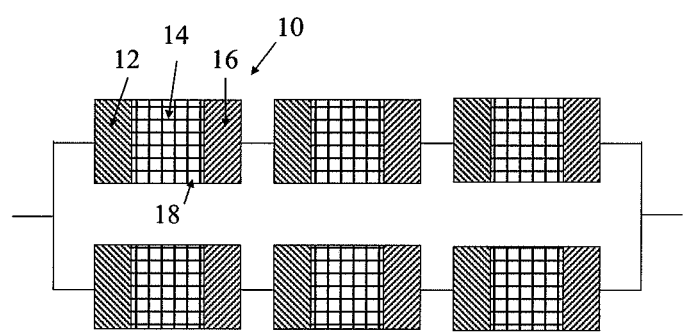
FIG. 20 schematically illustrates a battery comprising a plurality of electrochemical cells of FIG. 19.

A detailed schematic illustration of an electrochemical cell 10 of the invention is shown in FIG. 19. Cell 10 comprises negative electrode 12 separated from positive electrode 16 by a GC derivative-containing electrolyte 14, all contained in insulating housing 18 with suitable terminals (not shown) being provided in electronic contact with negative electrode 12 and positive electrode 16. Electrode 16 comprises metallic collector foil 15 and active layer 17. Binders and other materials normally associated with both the electrolyte and the negative and positive electrodes are well known in the art and are not described herein, but are included as is understood by those of ordinary skill in this art. FIG. 20 provides a schematic illustration of one example of a battery in which two strings of electrochemical cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrolyte composition for a lithium or lithium-ion battery comprising about 1.2 M LiPF$_6$ in a liquid carrier comprising:
   (a) ethylene carbonate and ethyl methyl carbonate in a respective weight ratio of about 3:7; and
   (b) about 0.1 to about 10 percent by weight of the compound of Formula (I), based on the total weight of the liquid carrier:

(I)

wherein X is selected from O, O(CO)O, S, N, P, P(=O), B, and Si; n is 1 when X is O, O(CO)O, or S; n is 2 when X is N, P, P(=O), or B; n is 3 when X is Si; and each R independently is selected from the group consisting of alkyl, alkenyl, alkynyl, aryl, acyl, heteroaryl, a 5-member ring heterocyclic group, a 5-member ring heterocycle-substituted methyl group, and trialkylsilyl, wherein the alkyl, alkenyl, alkynyl, aryl, acyl, heteroaryl, 5-member ring heterocyclic group, 5-member ring heterocycle-substituted methyl group, and trialkylsilyl optionally is substituted with one or more fluoro substituents; and R is acyl only when X is O, S, or N, and R is not alkyl when X is O(CO)O.

2. The electrolyte of claim 1 wherein X is O and R is ($C_1$ to $C_6$)alkyl, ($C_1$ to $C_6$)alkenyl, ($C_1$ to $C_6$)acyl, or trialkylsilyl; or X is O(CO)O and R is ethylene carbonate-substituted methyl.

3. An electrochemical cell comprising an anode, a cathode, and an electrolyte of claim 1 in contact with the anode and the cathode.

4. An electrolyte composition for a lithium or lithium-ion battery comprising $LiPF_6$ in a liquid carrier comprising ethylene carbonate, ethyl methyl carbonate, and diglycidyl carbonate; wherein the diglycidyl carbonate is present at a concentration in the range of about 0.1 to about 10 percent by weight based on the total weight of the liquid carrier; and the ethylene carbonate and ethyl methyl carbonate are present in the composition in respective a weight ratio of about 3:7.

5. The electrolyte composition of claim 4 wherein the $LiPF_6$ is present in the liquid carrier at a concentration of about 0.1 M to about 5 M.

6. The electrolyte composition of claim 4 wherein the $LiPF_6$ is present in the liquid carrier at a concentration of about 1 M to about 1.5 M.

7. An electrochemical cell comprising an anode, a cathode, and an electrolyte of claim 4 in contact with the anode and the cathode.

* * * * *